US012667180B2

(12) United States Patent
Yang

(10) Patent No.: US 12,667,180 B2
(45) Date of Patent: Jun. 30, 2026

(54) DESKTOP MAKEUP MIRROR

(71) Applicant: Miao Yang, Laohekou (CN)

(72) Inventor: Miao Yang, Laohekou (CN)

( * ) Notice: Subject to any disclaimer, the term of this patent is extended or adjusted under 35 U.S.C. 154(b) by 0 days.

(21) Appl. No.: 19/270,105

(22) Filed: Jul. 15, 2025

(65) Prior Publication Data

US 2025/0338947 A1 Nov. 6, 2025

(51) Int. Cl.

| | |
|---|---|
| ***A45D 42/10*** | (2006.01) |
| ***F21V 23/04*** | (2006.01) |
| ***F21V 33/00*** | (2006.01) |

(52) U.S. Cl.

CPC .............. *A45D 42/10* (2013.01); *F21V 23/04* (2013.01); *F21V 33/0004* (2013.01); *F21V 33/004* (2013.01)

(58) Field of Classification Search

CPC ....... A45D 42/10; F21V 23/04; F21V 33/004; F21V 33/0004

USPC .......................................................... 362/128

See application file for complete search history.

(56) References Cited

U.S. PATENT DOCUMENTS

| | | | | |
|---|---|---|---|---|
| 8,356,908 | B1 * | 1/2013 | Zadro | F21V 33/004 362/135 |
| 9,347,660 | B1 * | 5/2016 | Zadro | A45D 42/08 |
| 11,549,680 | B2 * | 1/2023 | Feit | F21V 23/005 |
| 12,232,592 | B1 * | 2/2025 | Covey | A45D 42/16 |
| 2023/0165356 | A1 * | 6/2023 | Yang | A45D 42/00 359/872 |

FOREIGN PATENT DOCUMENTS

| | | | | |
|---|---|---|---|---|
| CN | 110200395 | A * | 9/2019 | A45C 13/02 |
| CN | 209788900 | U | 12/2019 | |
| CN | 218942515 | U | 5/2023 | |
| CN | 117502872 | A * | 2/2024 | A47G 1/02 |
| CN | 220756823 | U | 4/2024 | |

* cited by examiner

*Primary Examiner* — Laura K Tso

(57) ABSTRACT

A desktop makeup mirror is disclosed, which includes a base, a connector and a mirror body. The base includes a base body and a support rod. One end of the support rod is connected to the base body. The connector is provided with a first connection hole and at least two second connection holes. The connector is connected to the other end of the support rod through the first connection hole. The two second connection holes are respectively connected to both ends of the mirror body, and the mirror body is rotatably coupled to the connector. The mirror body includes opposing first mirror surface and second mirror surface, and is further equipped with a supplementary light and a switch button for controlling the light.

9 Claims, 10 Drawing Sheets

DESKTOP MAKEUP MIRROR

TECHNICAL FIELD

The invention relates to the technical field of makeup mirrors, in particular to a desktop makeup mirror.

BACKGROUND ART

A makeup mirror is a reflective device used for cosmetic application to provide enhanced visualization of facial details. Depending on classification criteria, makeup mirrors may be categorized into various types. By usage scenario, these typically include portable makeup mirrors, desktop makeup mirrors and wall-mounted makeup mirrors. For residential use, large-format high-definition desktop makeup mirrors are generally preferred. Conversely, portable makeup mirrors are more suitable for outdoor applications.

The substantial dimensions of conventional desktop makeup mirrors create operational difficulties in mirror angle adjustment, typically requiring rotation of the entire assembly, resulting in a highly inconvenience. Beside, desktop mirrors face diverse usage environments where insufficient ambient lighting frequently occurs. However, due to their large size, desktop makeup mirrors are inconvenient to relocate, making it difficult to adjust their position according to ambient lighting conditions. Frequent repositioning of the mirror to areas with stronger illumination requires considerable effort and resources, resulting in a poor user experience.

SUMMARY

The invention aims to resolve the technical issues in conventional desktop makeup mirrors, specifically the difficulty in adjusting the mirror angle and insufficient ambient lighting intensity.

A desktop makeup mirror is disclosed which includes a base, a connector and a mirror body. The base includes a base body and a support rod. One end of the support rod is connected to the base body.

The connector is provided with a first connection hole and at least two second connection holes. The connector is connected to the other end of the support rod through the first connection hole.

The two second connection holes are respectively connected to both ends of the mirror body, and the mirror body is rotatably coupled to the connector. The mirror body includes opposing first and second mirror surfaces, and is further equipped with a supplementary light and a switch button. The switch button is electrically connected to the supplementary light to control its on/off state, and the supplementary light is disposed between the first and second mirror surfaces.

Optionally, the connector is rotatably connected to the support rod.

Optionally, the base body has a bottom surface area larger than that of the support rod.

Optionally, the support rod includes a first connecting arm and a second connecting arm detachably connected to each other, and the base body is detachably connected to the support rod.

Optionally, at least one of the first or second mirror surfaces is a concave mirror.

Optionally, the mirror body further includes a bracket, a first mirror connector, and a second mirror connector. The first and second mirror surfaces are respectively disposed on opposite sides of the bracket, with the first mirror surface embedded in the first mirror connector and the second mirror surface embedded in the second mirror connector.

Optionally, the supplementary light is configured with stepless brightness adjustment, which is controllable via the switch button.

Optionally, the supplementary light provides at least three color temperature options.

Optionally, multiple supplementary lights are arranged at intervals along an edge of the mirror body.

Optionally, the anti-slip pad is attached to the bottom of the base body.

The present invention provides a desktop makeup mirror including a base body and a support rod. The base body is positioned at the bottommost part to provide foundational support, with the support rod connected to the base body. The mirror body is mounted onto the support rod, thereby achieving an elevated position through the supporting of the support rod. In this embodiment, connectors are incorporated between the support rod and the mirror body. After installing the connector onto the support rod, the mirror body is then mounted through this connector. Since the connector is attached to both ends of the mirror body via rotational connections, the mirror body can achieve 360-degree rotation within the connector with simple and convenient operation. The configuration effectively resolves the difficulty in adjusting the mirror's position while significantly expanding its range of rotational movement.

DESCRIPTION OF THE ACCOMPANYING DRAWINGS

In order to more clearly illustrate the technical solutions of the present invention or the prior art, The follow is a brief description of that drawings use in the description of the embodiments or prior art, The drawings in the following description are some embodiments of the invention, other drawings can be obtained from these drawings without creative efforts.

DETAILED DESCRIPTION OF THE EMBODIMENTS

In order to make the purpose, technical scheme and advantages of the invention more clear, the invention will be combined with the attached drawings, For a clear and complete description of the technical solutions of the present invention, it is obvious that the described embodiments are part of the embodiments of the present invention. But not all embodiments. Based on the embodiments of the present invention, All other embodiment obtained by a person of ordinary skill in that art without creative effort, All fall within the scope of the present invention.

Figure 1:
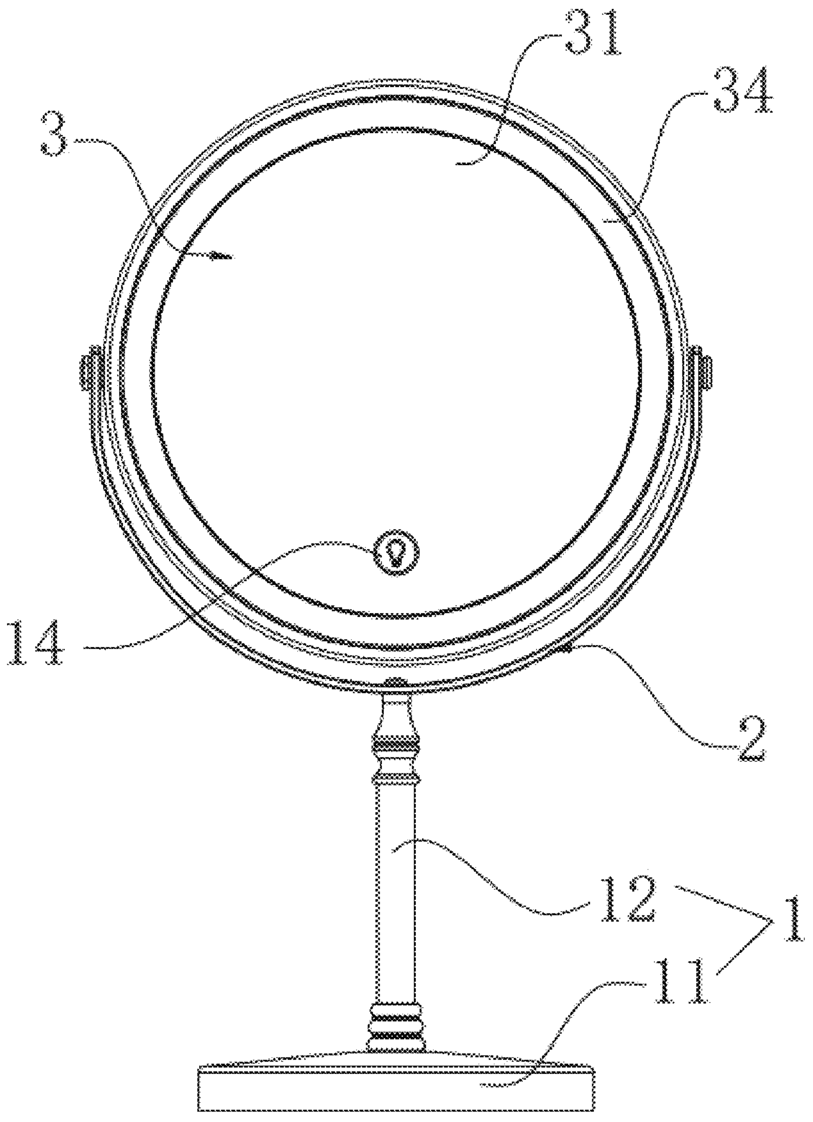
FIG. 1 is a front elevation view of the desktop makeup mirror according to the present invention.

With reference to FIG. 1, a desktop makeup mirror according to the present invention is disclosed. The makeup mirror includes a base 1, a connector 2 and a mirror body 3. The base 1 includes a base body 11 and a support rod 12, with one end of the support rod 12 connected to the base body 11. The connector 2 is provided with a first connection hole 21 and at least two second connection holes 22. The connector 2 is connected to the other end of the support rod 12 through the first connection hole 21. The two second connection holes 22 are respectively connected to both ends of the mirror body 3, which is rotatably coupled to the connector 2. The mirror body 3 includes opposing first mirror surface 31 and second mirror surface 32, and is further equipped with a supplementary light 13 and a switch button 14. The switch button 14 is electrically connected to the supplementary light 13 to control its on/off state, with the supplementary light 13 disposed between the first mirror surface 31 and the second mirror surface 32.

Collectively referring to FIGS. 1-6, in this embodiment, the desktop makeup mirror is supported by the base 1 and is typically placed on a tabletop for use, requiring the mirror surface to be elevated above the table. Accordingly, the base 1 includes the base body 11 and the support rod 12. The base body 11 serves as the foundation placed on the tabletop, while the support rod 12 is vertically mounted on the base body 11 to extend upward and provide elevated support. Preferably, the support rod 12 is positioned at the central portion of the base body 11 through its lower end, ensuring more uniform force distribution across the base body 11. Furthermore, the base body 11 is preferably configured as a circular plate. This circular design ensures consistent support width in all directions, allowing external forces (e.g., impacts or vibrations) to be evenly distributed across the entire circumference, thereby reducing localized stress concentration and preventing unilateral tilting. Compared to polygonal bases (e.g., square-shaped), the circular base lacks protruding edges, further minimizing the risk of accidental tipping due to collisions and enhancing safety.

After the base body 11 and support rod 12 are assembled to form the base 1, the connector 2 is installed at the upper end of the support rod 12, i.e., the end distal to the base body 11. The connector 2 is provided with the first connection hole 21 and second connection holes 22. The first connection hole 21 is used to connect with the support rod 12. By passing the upper end of the support rod 12 through the first connection hole 21, the support rod 12 and the connector 2 are mutually connected. Once connected to the support rod 12, the connector 2 is elevated to a certain height above the tabletop due to the support provided by the rod.

Subsequently, the mirror body 3 is mounted onto the connector 2, allowing it to be supported at an elevated position relative to the tabletop. During use, this configuration enables the mirror body 3 to stand stably on the tabletop for convenient operation. The mirror body 3 is connected to the connector 2 through the second connection holes 22, with the connection points located at the ends of the mirror body 3.

In this embodiment, the connector 2 is provided with two second connection holes 22, which are respectively connected to both ends of the mirror body 3. Since the connection between the connector 2 and mirror body 3 is rotational, the rotational connection is achieved by first aligning the two second connection holes 22 with corresponding ends of the mirror body 3, then inserting two pivot pins through the second connection holes 22 into the mirror body 3. The axis formed by connecting these two second connection holes 22 serves as the rotation axis for the mirror body 3.

Figure 2:
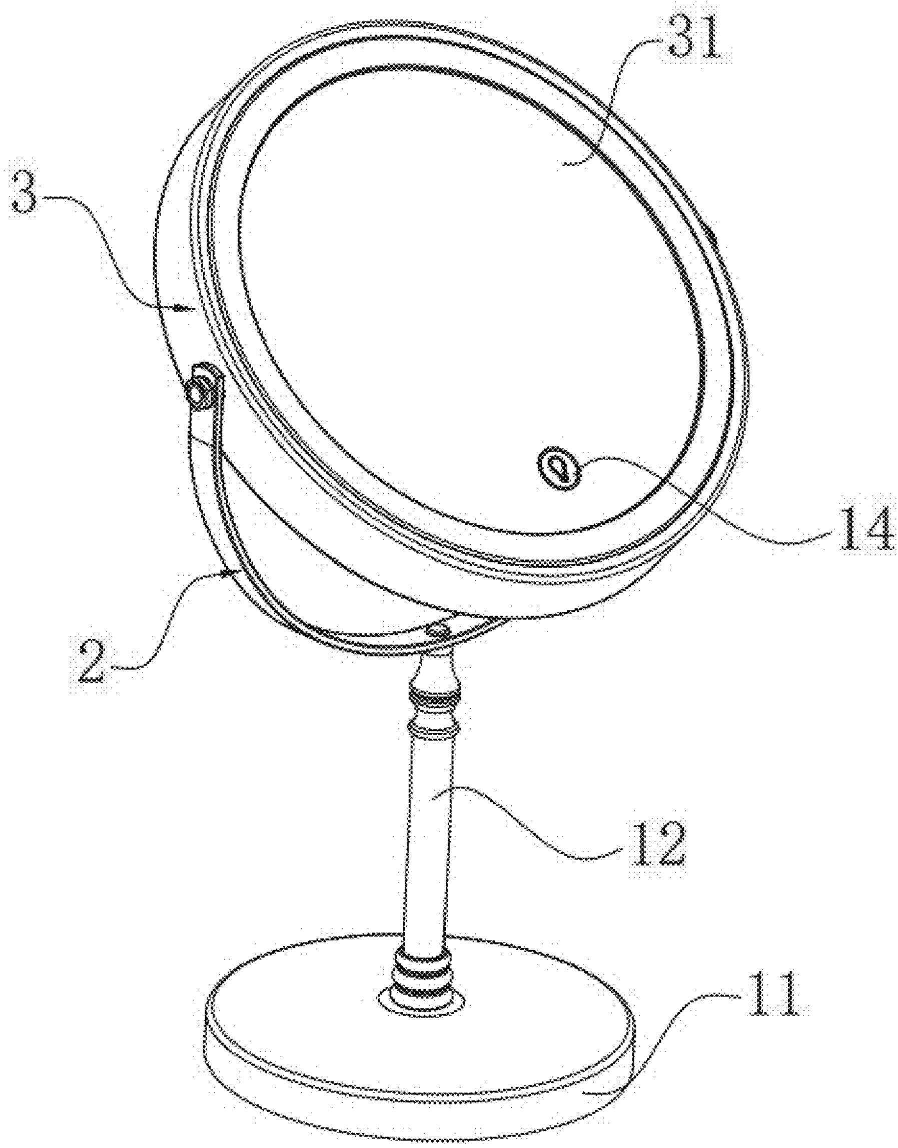
FIG. 2 is a schematic diagram showing the mirror body after rotation in the desktop makeup mirror of the present invention.
Figure 3:
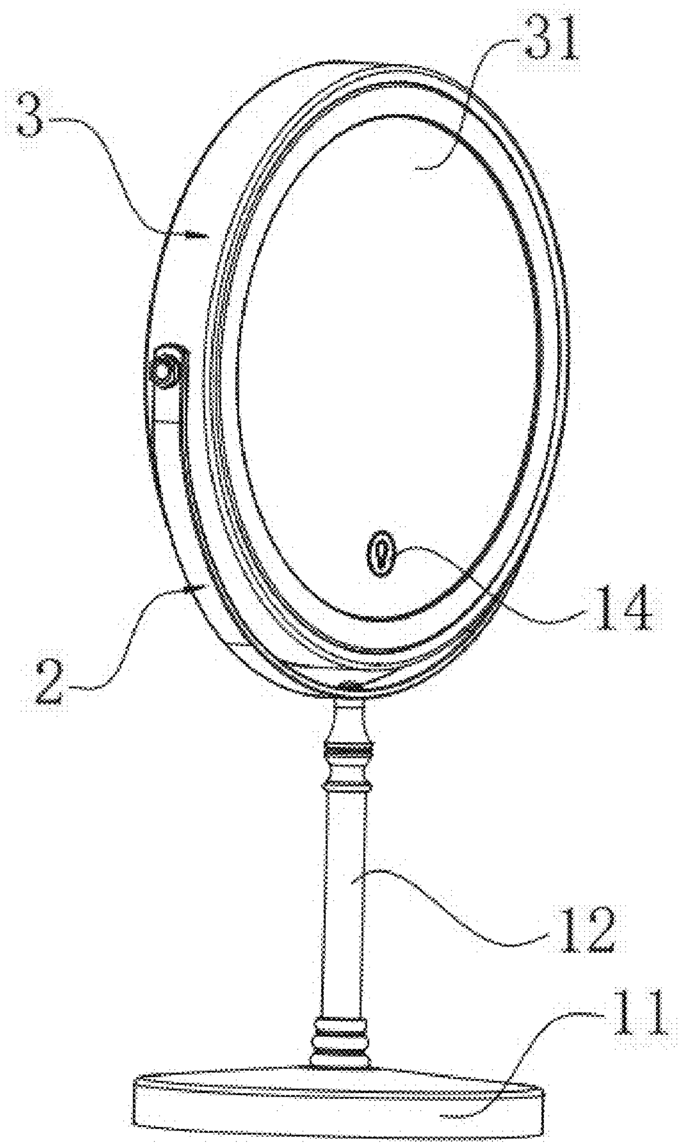
FIG. 3 is a schematic diagram showing the connector after rotation in the desktop makeup mirror of the present invention.

Referring to both FIG. 1 and FIG. 2, which respectively illustrate the mirror body 3 before and after rotation. The mirror body 3, being supported by and connected to the connector 2 at the two second connection holes 22, utilizes the connection points as fulcrums during rotation. The rotational connection between the mirror body 3 and connector 2 enables 360-degree rotation of the mirror body, thereby providing a wider range of viewing angles and significantly enhancing the versatility of the desktop makeup mirror. Moreover, this rotation mechanism, facilitated entirely by the connector 2, offers exceptionally simple and convenient operation.

Furthermore, the mirror body 3 is preferably circular in configuration. This circular design offers technical advantages of symmetrical light reflection and minimized edge distortion compared to square configurations. It provides more uniform aberration distribution, eliminates stress concentration at corners, achieves balanced stress distribution and reduces fracture risk due to absence of sharp edges. Rounded edges prevent accidental scratches. Beside, circular mirror body naturally aligns with visual focus points thanks to the elliptical effective visual field of human eyes, enhancing user comfort during prolonged use.

Given the circular geometry of mirror body 3, the two second connection holes 22 are optimally positioned at diametrically opposed points on the circumference.

In the present embodiment, since the mirror body 3 adopts a circular configuration, the two second connection holes 22 connecting to both ends of the mirror body 3 are positioned along its circumference. Preferably, these connection holes 22 are arranged at diametrically opposed positions, i. e., at opposite ends of the same diameter line of the circular mirror body 3. The connection line between the two second connection holes 22 defines the rotation axis. When positioned diametrically, this rotation axis coincides exactly with a diameter of the circular mirror body 3. When the rotation axis coincides with the diameter, the mass distribution of the circular mirror main body 3 is completely symmetrical, no centrifugal force difference will be generated during rotation, and dynamic balance can be achieved without additional counterweights. When the circular mirror main body 3 rotates around its diameter, the moment of inertia is uniform and the calculated value is the smallest, which means that the torque required for initiating or stopping is smaller, the user can more easily rotate the mirror main body 3 during use, improving comfort.

Meanwhile, when the rotational axis coincides with the diameter, the centrifugal force is uniformly distributed along the circumference without localized stress concentration. This prevents fatigue fractures at the connection points between connector 2 and mirror body 3, thereby improving the overall service life. Since the connection between the two second connection holes 22 and mirror body 3 is achieved through pivot pins, these pins serve as the support shafts for mirror body 3. The design where the rotational axis coincides with the diameter ensures that the radial forces borne by the support shafts are uniformly distributed, the wear rate remains consistent, premature damage at specific locations is prevented and the product lifespan is consequently prolonged.

Figure 5:
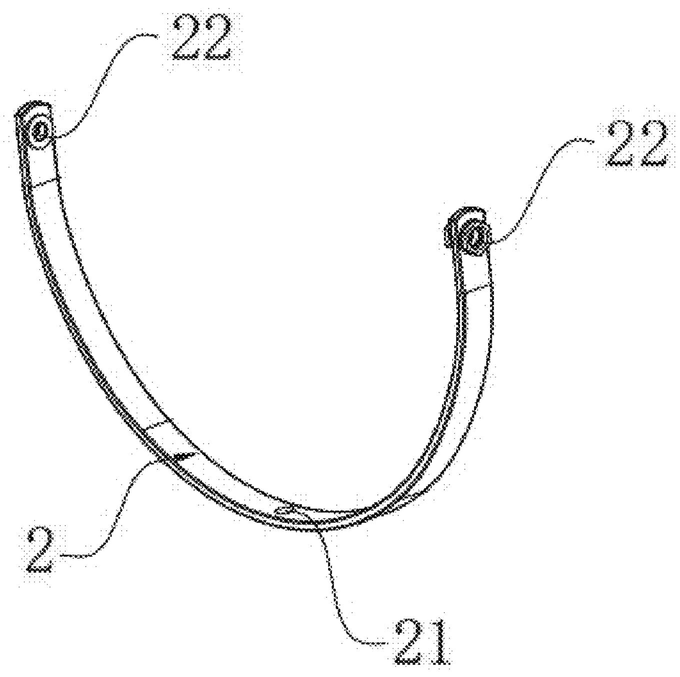
FIG. 5 is a structural diagram of the connector according to the present invention.

As shown in FIG. 5, when the mirror body 3 adopts a circular configuration with its rotational axis designed to coincide with the diameter, the connector 2 is correspondingly designed in a semicircular shape. The diameter of the connector 2 matches that of the mirror body 3, ensuring close conformity between the two components while maintaining unobstructed rotation of the mirror body 3. The semicircular design of the connector 2 not only enhances aesthetic appeal but also achieves material efficiency.

In this embodiment, since the mirror body 3 serves for reflection during cosmetic application, it must maintain a fixed position after rotation to allow hands-free operation, thereby facilitating more comfortable makeup application. Accordingly, the rotational connection between the connector 2 and mirror body 3 incorporates a resistance-enhancing mechanism. Specifically, as the connection is achieved through the engagement of the second connection holes 22 with pivot pins, this embodiment employs an interference fit between these components. This design increases frictional force through enhanced pressure, ensuring stable positioning of the mirror body 3 after rotation.

To maintain operational ease, the degree of interference is carefully controlled to prevent excessive rotational resistance. It should be noted that alternative connection methods, such as gear-based mechanisms, may also be implemented, though these are not exhaustively enumerated herein.

Figure 8:
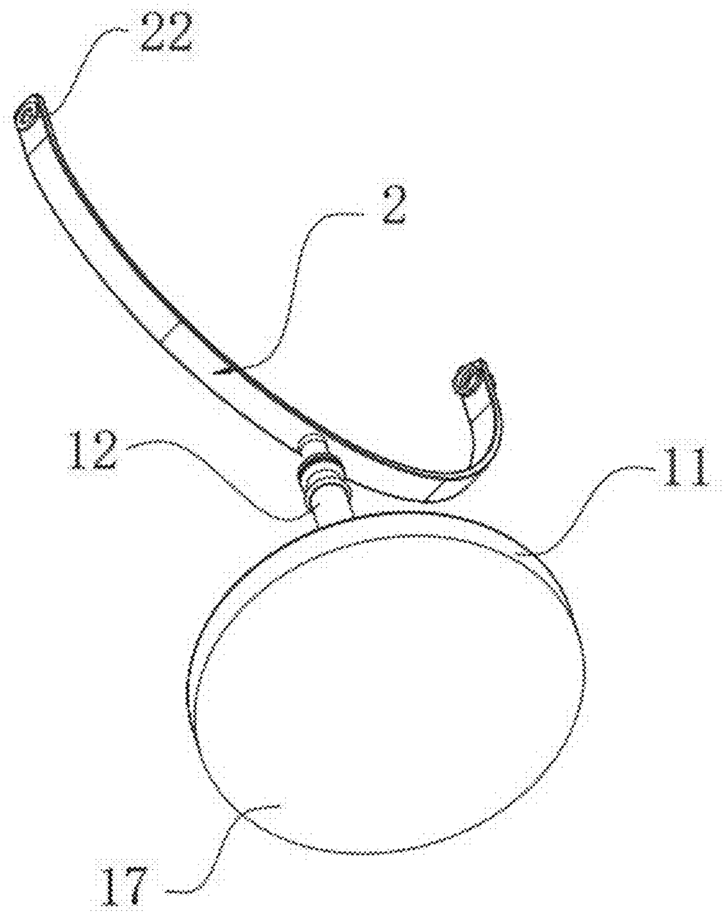
FIG. 8 is a structural diagram showing the second mirror surface of the mirror body according to the present invention.

Referring to both FIG. 1 and FIG. 8, in this application, the mirror body 3 is capable of 360° rotation, therefore it is designed with opposing first mirror surface 31 and second mirror surface 32. This configuration ensures reflective functionality regardless of which surface is rotated into position. As shown in FIG. 1, when facing the first mirror surface 31, the user simply needs to rotate the mirror body 3 by 180° to bring the second mirror surface 32 into proper viewing position.

Figure 4:
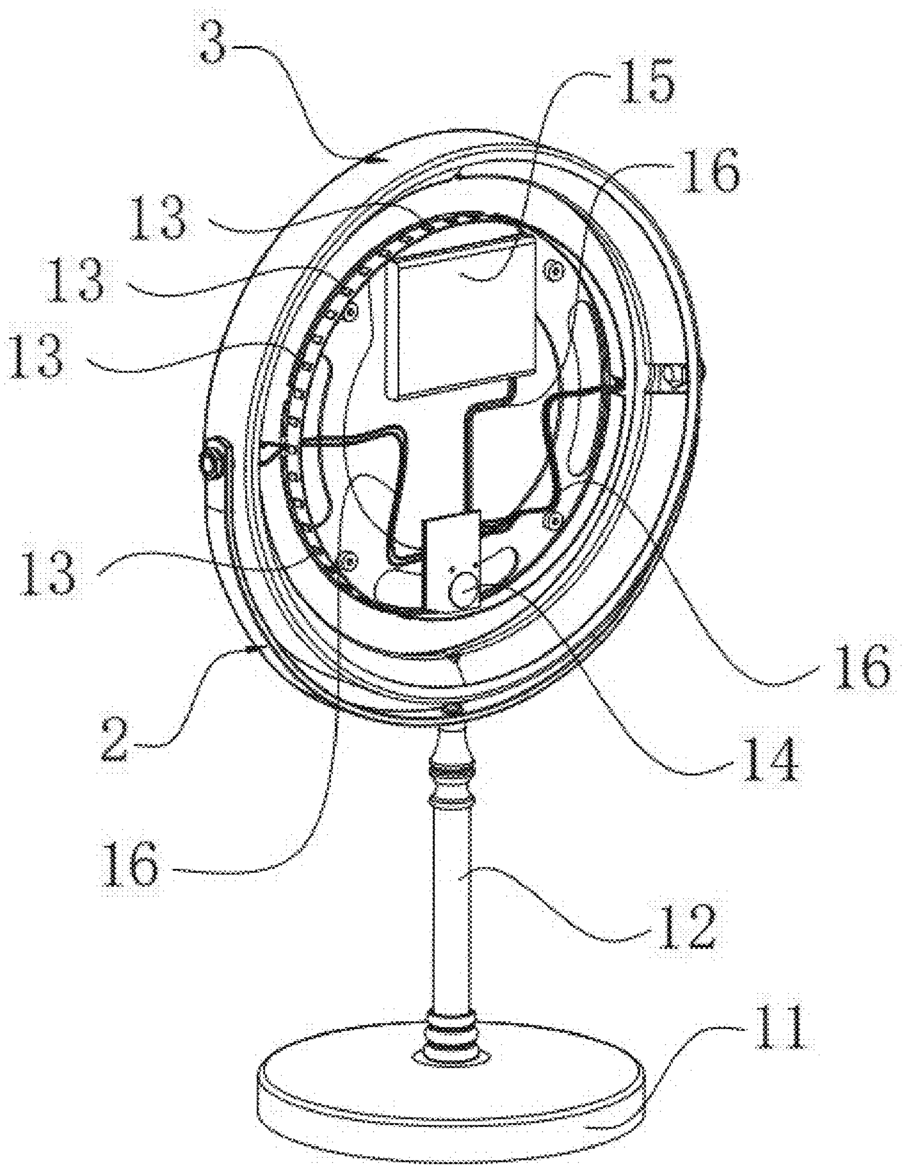
FIG. 4 is a cross-sectional view illustrating the internal structure of the mirror body according to the present invention.

As illustrated in FIG. 4, the mirror body 3 incorporates an internal supplementary light 13 connected to a touch-sensitive switch button 14, both housed within the mirror structure. The makeup application process requires specific lighting conditions which ambient light may not always satisfy. The switch button 14 activates the supplementary light 13 to provide additional illumination when needed. The placement of the supplementary light 13 between the first mirror surface 31 and second mirror surface 32 creates a dual illumination effect of simultaneous lighting of both mirror surfaces and consistent brightness enhancement regardless of which surface is in use.

Further, as shown in FIG. 4, it can also be seen that the interior of the mirror body 3 further includes a battery 15 and wires 16. Both the supplementary light 13 and the battery 15 are connected to the switch button 14 via the wires 16, and are then uniformly controlled through the switch button 14. When the supplementary light 13 needs to be turned on, the user simply presses the switch button 14. The switch button 14 then connects the supplementary light 13 with the battery 15. The battery 15 transmits electrical energy to the switch button 14 through the wires 16, and the switch button 14 in turn delivers the electrical energy to the supplementary light 13 through the wires 16. Upon receiving the electrical energy, the supplementary light 13 activates and emits light.

At the same time, since the mirror body 3 and the connector 2 are connected through a shaft-hole fit via the two second connection holes 22, corresponding connection holes are also provided on the mirror body 3. In this embodiment, components such as the supplementary light 13 and battery 15 are all arranged inside the mirror body 3. When the battery 15 is depleted, it needs to be charged externally. The holes used for connecting the mirror body 3 and the connector 2 are precisely utilized for this charging purpose. As shown in FIG. 4, a wire 16 extends outward from the switch button 14. This wire 16 runs continuously from the switch button 14 to the location of one of the second connection holes 22, thereby forming a charging port 18.

Figure 10:
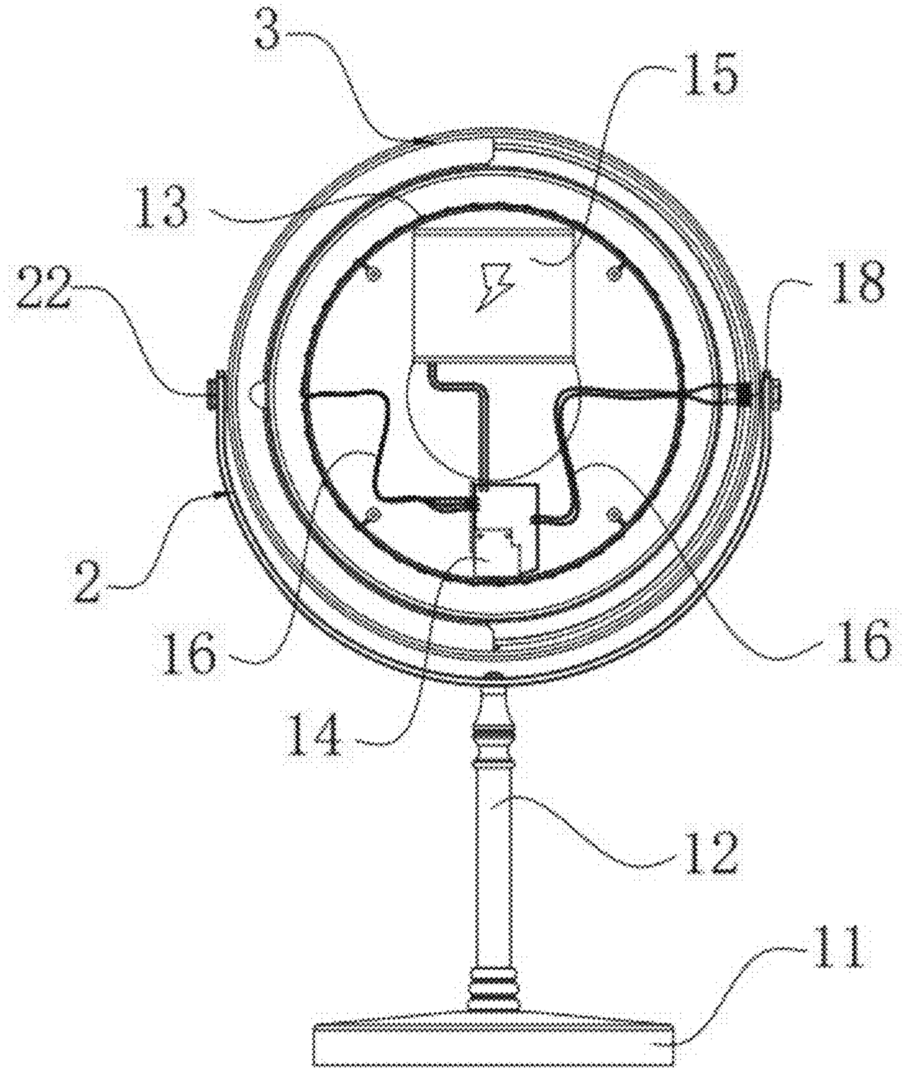
FIG. 10 is another cross-sectional view illustrating the internal structure of the mirror body according to the present invention.

As shown in FIG. 10, in this embodiment, the charging port 18 is located at the right end position in FIG. 10. Therefore, the wire 16 extending outward from the switch button 14 is connected to the charging port 18 at the right end in FIG. 10. In this embodiment, the charging port 18 is preferably a DC charging port. When an external charger is connected to the charging port 18, external electrical energy is transmitted through the wire 16 to the switch button 14, and then the switch button 14 delivers the electrical energy to the battery 15 through another wire 16, thereby completing the charging operation.

Moreover, the battery 15 provided in this application has a capacity of 3000 mAh. When fully charged, it can provide continuous wireless operation for 4 hours at the highest brightness level, saving battery 15 replacement costs and achieving a 30% improvement compared to other power supply methods.

In this embodiment, the connector 2 is connected to both ends of the mirror body 3 through a rotational connection, enabling the mirror body 3 to rotate 360°, thereby improving the applicability of the desktop makeup mirror. On this basis, the mirror body 3 is equipped with two mirror surfaces, namely the first mirror surface 31 and the second mirror surface 32, which can be used more conveniently in combination with the rotation of the mirror body 3. At the same time, the mirror body 3 also contains the supplementary light 13. When ambient light intensity is insufficient, the supplementary light 13 can be turned on via the switch button 14, thereby enhancing overall light intensity through the light emitted by the supplementary light 13, solving the problem of insufficient ambient light intensity.

In one embodiment, the connector 2 is rotatably connected to the support rod 12. Referring to both FIG. 1 and FIG. 3, when rotating from the state shown in FIG. 1 to the state shown in FIG. 3, there is no need to rotate the entire desktop makeup mirror. Since the entire desktop makeup mirror has relatively large mass and volume, rotation would be difficult. In this embodiment, the connector 2 is rotatably connected to the support rod 12, so when rotating the connector 2, it can drive the mirror body 3 to rotate together. The connector 2 rotates about the support rod 12 as its axis, so the rotation axis of the connector 2 is perpendicular to the rotation axis of the mirror body 3. Therefore, the rotation of the mirror body 3 driven by the connector 2 and the self-rotation of the mirror body 3 occur around two different rotation axes, further expanding the rotation range of the mirror body 3. Users can more easily rotate the connector 2, improving applicability.

In one embodiment, the base area of the base body 11 is larger than that of the support rod 12. In one embodiment, an anti-slip pad 17 is provided at the bottom of the base body 11.

Figure 6:
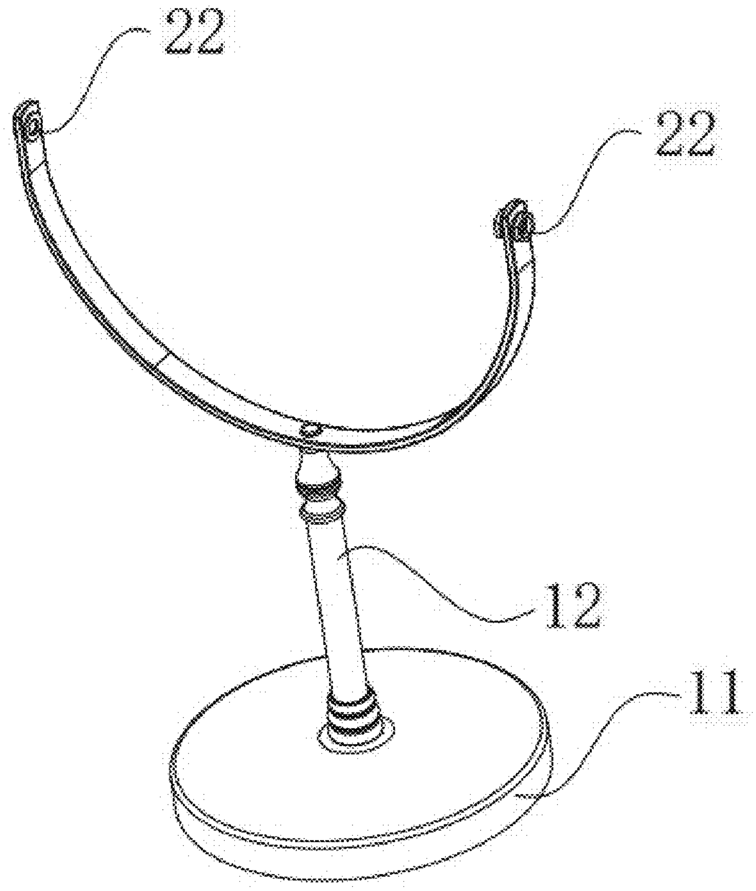
FIG. 6 is an assembled structural diagram showing the connection between the connector and base according to the present invention.

As shown in FIG. 6, the base body 11 is preferably circular. Since the base body 11 serves as the support foundation of the entire structure, when placed, the base body 11 is positioned at the very bottom in direct contact with the table surface. The connector 2 and mirror body 3 are installed above the base body 11, and their mass accounts for a relatively large proportion of the total mass, resulting in a relatively high center of gravity for the entire desktop makeup mirror, thereby increasing the risk of the mirror tipping over. Therefore, in this embodiment, the base area of the base body 11 is increased, thereby increasing the contact area between the base body 11 and the table surface.

When the gravity action line (passing through the center of gravity) of the mirror body 3 falls within the base range, the mirror body 3 remains stable. Once it exceeds the base boundary, it will overturn. In this embodiment, since the base body 11 has a larger area, the overturning critical line (horizontal distance from the edge of base body 11 to the center of gravity) is farther away, requiring greater external torque to topple the mirror, thereby maintaining overall stability and improving anti-tipping capability. Moreover, increasing the base area of base body 11 also increases its contact area with the table surface, thereby increasing friction and further enhancing stability.

Figure 7:
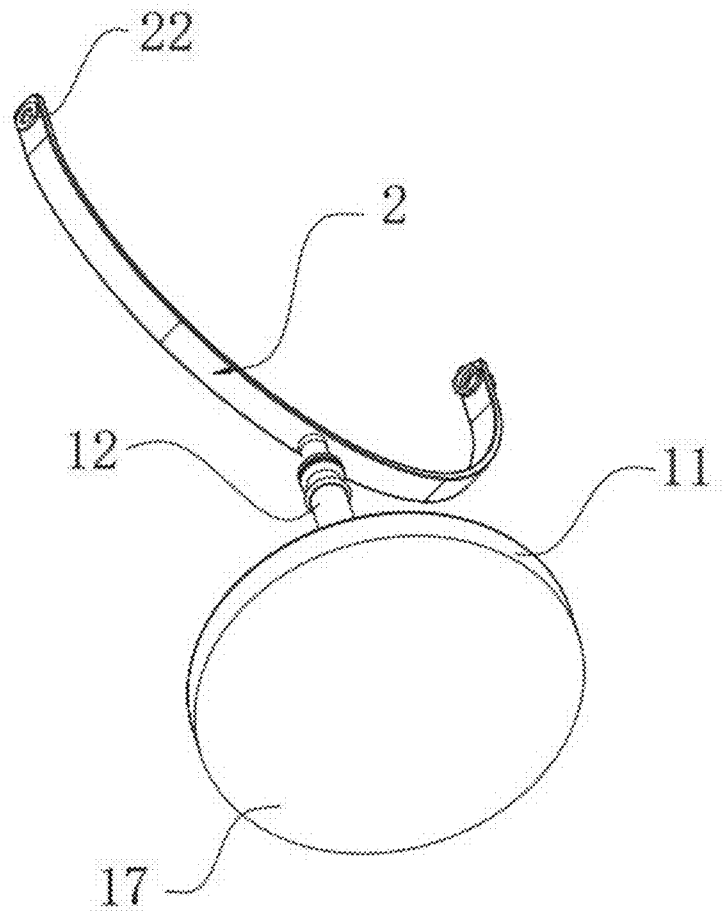
FIG. 7 is a bottom view diagram of the base according to the present invention.

As shown in FIG. 7, in this embodiment, on the basis of increasing the base area of base body 11, an anti-slip pad 17 is additionally provided at the bottom of base body 11. Through contact between the anti-slip pad 17 and the table surface, the friction coefficient with the table surface is increased, further enhancing friction and thereby improving overall stability once again.

In one embodiment, the support rod 12 includes a first connecting arm 121 and a second connecting arm 122. The first connecting arm 121 and the second connecting arm 122 are detachably connected, and the base body 11 is detachably connected to the support rod 12.

As shown in FIG. 6, in this embodiment, the height requirement for support rod 12 is limited, so two connecting arms are used as an example for explanation. In different embodiments, the support rod 12 may also include a third connecting arm, a fourth connecting arm, etc. In this embodiment, the first connecting arm 121 and the second connecting arm 122 are connected by threads, which can maintain stability after connection. At the same time, when disconnection is needed, the first connecting arm 121 and the second connecting arm 122 can also be separated by rotating the threads. When using the desktop makeup mirror, the first connecting arm 121 and the second connecting arm 122 are connected to each other to form a complete support rod 12. When transporting the desktop makeup mirror, the support rod 12 can be disassembled into the first connecting arm 121 and the second connecting arm 122, thereby reducing the size of individual components for easier transportation. This also reduces transportation and storage costs, and makes the components less prone to damage during transportation.

In one embodiment, at least one of the first mirror surface 31 and the second mirror surface 32 is a concave mirror. Further, since the mirror body 3 has two mirror surfaces, one of them is designed as a concave mirror in this embodiment. As shown in FIG. 8, this embodiment uses the second mirror surface 32 as a concave mirror for illustration. The effect of the concave mirror is to magnify during reflection, with the magnification typically ranging from three to ten times. In this application, the mirror body 3 is used in makeup scenarios, and the magnification effect of the concave mirror can meet the usage requirements. In this embodiment, the second mirror surface 32 has a tenfold magnification effect. Therefore, during use, when normal reflection is needed, the first mirror surface 31 can be aligned for use. When magnification is needed, the mirror body 3 can be rotated 180° to align the second mirror surface 32 for use.

The human brain relies on binocular disparity and perspective to judge distance, but the distorted image from a concave mirror can distort spatial perception, making it difficult for the brain to interpret real depth relationships, causing confusion and dizziness. Therefore, when using the second mirror surface 32 with a tenfold magnification effect, users need to maintain a distance of at least six inches from the second mirror surface 32 to avoid dizziness.

In one embodiment, the mirror body 3 further includes a bracket 33, a first mirror connector 34, and a second mirror connector 35. The first mirror surface 31 and the second mirror surface 32 are respectively arranged on both sides of the bracket 33. The first mirror surface 31 is connected to the bracket 33 through the first mirror connector 34 and is embedded in the first mirror connector 34. The second mirror surface 32 is connected to the bracket 33 through the second mirror connector 35 and is embedded in the second mirror connector 35.

Figure 9:
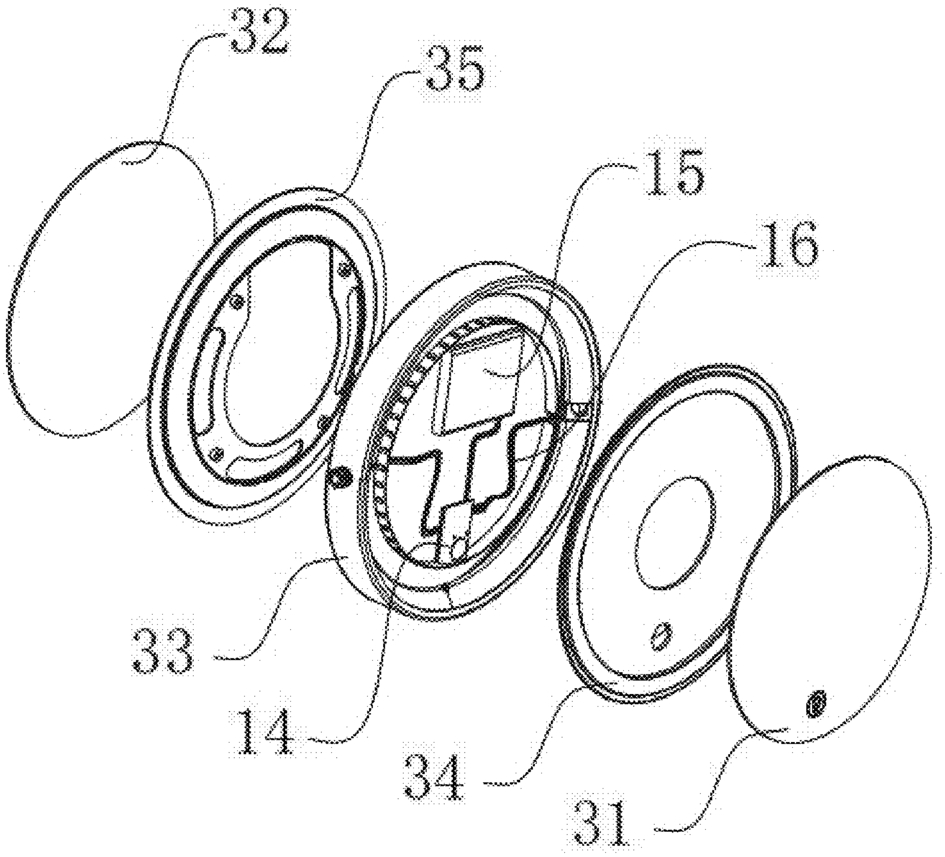
FIG. 9 is an exploded view diagram of the mirror body assembly according to the present invention.

Referring to FIG. 2, FIG. 8, and FIG. 9, since the mirror body 3 is circular, the bracket 33 is cylindrical with a certain thickness, allowing components such as the supplementary light 13 and the switch button 14 to be installed inside the bracket 33. The first mirror surface 31 and the second mirror surface 32 are respectively connected to the two end faces of the bracket 33, so that the first mirror surface 31, the second mirror surface 32, and the bracket 33 form a cylinder, enclosing components such as the supplementary light 13 inside. Since the first mirror surface 31 and the second mirror surface 32 need to reflect light, they cannot be transparent.

Therefore, in this embodiment, the first mirror connector 34 has a first extension portion at the outer rim of the first mirror surface 31, and the first extension portion is made of light-transmitting material. The first mirror surface 31 is circular, so the first extension portion arranged along its outer rim is annular. The inner rim of the first mirror connector 34 is connected to the first mirror surface 31, while the outer rim is connected to the bracket 33. Thus, when the supplementary light 13 is turned on, the light emitted can pass through the first extension portion to provide supplementary lighting for the first mirror surface 31. Similarly, the second mirror connector 35 connects the second mirror surface 32 to the bracket 33 in the same manner, which will not be repeated here. The supplementary light 13 is a point light source that emits light in all directions, so the light can simultaneously pass through the first mirror connector 34 and the second mirror connector 35, allowing the supplementary light 13 to provide lighting for both the first mirror surface 31 and the second mirror surface 32. Therefore, after turning on the supplementary light 13, regardless of which mirror surface is used, the supplementary lighting effect can be achieved.

In one embodiment, the supplementary light 13 is provided with a stepless brightness adjustment mode, and the switch button 14 is used to control the supplementary light 13 to switch to the stepless brightness adjustment mode. In one embodiment, the supplementary light 13 is provided with at least three color temperatures. In one embodiment, the desktop makeup mirror includes multiple supplementary lights 13, which are arranged at intervals along the edge of the mirror body 3.

As shown in FIG. 4, the switch button 14 is electrically connected to the supplementary light 13, so the switch button 14 can control the supplementary light 13. Since the supplementary light 13 has a stepless brightness adjustment mode, this embodiment adjusts the brightness of the supplementary light 13 by long-pressing the switch button 14. Because the ambient light brightness varies in different scenarios, the required supplementary light intensity also differs. Therefore, adjusting by long-pressing the switch button 14 in this embodiment can better adapt to different scenarios, improving applicability.

Furthermore, in addition to light intensity, the supplementary light 13 in this embodiment also has three color temperatures. Since ambient color temperatures vary in different scenarios and different users have different color temperature preferences, this embodiment adjusts the color temperature of the supplementary light 13 by clicking the switch button 14. In this embodiment, the supplementary light 13 includes three color temperatures: white light, cool light, and warm light, which can meet most daily usage needs of users. The multiple supplementary lights 13 arranged at intervals along the edge of the mirror body 3 can make the light emitted by the supplementary lights 13 more uniform.

Finally, it should be noted that the above embodiments are only used to illustrate the technical solution of the present invention, not to limit it; While the present invention has been described in detail with reference to the foregoing embodiments, Those of ordinary skill in the art should understand that the technical solutions described in the foregoing embodiments can still be modified, Or part of the technical features are replaced equivalently; These modifications or substitutions do not make the essence of the corresponding technical solutions deviate from the spirit and scope of the technical solutions of the embodiments of the present invention.

What is claimed is:

1. A desktop makeup mirror, comprising:

a base, comprising a base body and a support rod, wherein one end of the support rod is connected to the base body;

a connector, comprising a first connection hole and at least two second connection holes, wherein the connector is connected to the other end of the support rod through the first connection hole; and a mirror body, wherein the at least two second connection holes are respectively connected to two ends of the mirror body, and wherein the mirror body is rotatably connected to the connector; the mirror body comprises a first mirror surface and second mirror surface opposite to the first mirror surface;

wherein the mirror body comprises supplementary lights and a switch button, wherein the switch button is electrically connected to the supplementary lights to control an on/off of the supplementary lights, and wherein the supplementary lights are disposed between the first mirror surface and the second mirror surface;

wherein the desktop makeup mirror further comprises a battery arranged in the mirror body, wherein the supplementary lights are connected to the switch button via a first wire, the battery is connected to the switch button via a second wire, one end of a third wire is connected to the switch button, and another end of the third wire extends to a position of one of the at least two second connection holes to form a charging port.

2. The desktop makeup mirror of claim 1, wherein the connector is rotatably connected to the support rod.

3. The desktop makeup mirror of claim 1, wherein a bottom area of the base body is larger than a bottom area of the support rod.

4. The desktop makeup mirror of claim 1, wherein at least one of the first mirror surface and the second mirror surface is a concave mirror.

5. The desktop makeup mirror of claim 1, wherein the mirror body further includes a bracket, a first mirror connector, and a second mirror connector, the first mirror surface and the second mirror surface are respectively disposed on two sides of the bracket, the first mirror surface is connected to the bracket through the first mirror connector and embedded into the first mirror connector, and the second mirror surface is connected to the bracket through the second mirror connector and embedded into the second mirror connector.

6. The desktop makeup mirror of claim 1, wherein the supplementary lights are configured with a stepless brightness adjustment mode, and the switch button is configured to switch the supplementary lights to the stepless brightness adjustment mode.

7. The desktop makeup mirror of claim 1, wherein the supplementary light is configured to emit light in at least three different color temperatures.

8. The desktop makeup mirror of claim 1, wherein the supplementary lights are arranged at intervals along an edge of the mirror body.

9. The desktop makeup mirror of claim 1, wherein an anti-slip pad is provided at a bottom of the base body.

* * * * *